3,079,334
CALCIUM BASE DRILLING FLUID
Arthur G. Clem, Des Plaines, Ill., assignor to American Colloid Company, Skokie, Ill., a corporation of Delaware
No Drawing. Filed Sept. 2, 1960, Ser. No. 53,627
5 Claims. (Cl. 252—8.5)

This invention relates to an improvement in well drilling fluids. More particularly this invention relates to an improvement in thinners for calcium-base drilling fluids.

Oil and gas wells are ordinarily drilled with the aid of a drilling fluid or mud which is based upon fresh water, that is, the fluid contains little or no soluble ionic materials. When such fresh water drilling fluids are used in drilling through native clays, such as "heaving shale," the clays have a tendency to hydrate and swell so as to seize or grip the drill pipe so tenaciously that some times it cannot be withdrawn from the hole. In order to prevent native clays from swelling it has been the practice to add calcium to the drilling fluid to convert it to calcium-base drilling fluid or mud. The first calcium-base fluids were based upon lime which effectively prevented the clays from hydrating but which produced fluids which solidified at high temperature. Modern calcium-base drilling fluids are based upon gypsum with additions of gypsum (two to ten times that amount which would be required to create a saturated solution) normally being kept in suspension in the drilling fluid. These calcium-base drilling fluids prevent swelling of native clays but cause an immediate increase in gel strength and/or viscosity to occur. Increased gel strength is generally undesirable in a drilling fluid or mud and consequently has led to the use of thinners to decrease the viscosity of the calcium-base drilling fluid.

It is an object of this invention to provide thinners which are effective in reducing gel strength and viscosity of drilling fluids containing calcium and act as deflocculants in calcium-base drilling fluids or muds. It is another object of this invention to provide calcium-base drilling fluids or muds which are of appropriate viscosity so that they may be pumped efficiently in well drilling operations while containing sufficient calcium to prevent swelling due to hydration of native clays. It is a further object to provide improved calcium-base drilling fluids. These and other objects will be apparent from and are accomplished in accordance with the following disclosure.

I have discovered that calcium-base drilling fluids containing leonardite combined with a polyphosphate provide highly effective drilling fluids of relatively low gel strength and viscosity which are highly effective in preventing hydration and swelling of native clays. Natural leonardite, which normally contains 20% to 50% moisture, can be used or it may be ground in an impact mill and dried to less than 20% moisture. Leonardite is a black carbonaceous material related to lignite and peat. It is a form of oxidized lignite and consists mainly of humic acid.

The polyphosphate which is combined with the leonardite is a soluble salt, such as sodium tetraphosphate, sodium hexametaphosphate, or sodium tripolyphosphate, although combinations of sodium tripolyphosphate and trisodium phosphate have proved equally successful. Other alkali metal polyphosphates may be used, such as potassium pyrophosphate and lithium hypophosphate. The leonardite and polyphosphate are intimately mixed as by contacting the leonardite and polyphosphate in the presence of moisture, such as that normally present in natural leonardite. Alternatively, the leondardite and polyphosphate can be ground together in a mill during which the finely divided polyphosphate becomes intimately mixed with the leonardite to create the finished product.

In the leonardite-polyphosphate product, the polyphosphate comprises 5% to 50% of the weight of the finished product and leonardite makes up most of the remainder. In some cases a non-ionic wetting agent may be added to improve the product. The product is prepared by mixing together the proper amount of polyphosphate and ground leonardite and then drying the product at a temperature in the range of 150–250° F. If dry powdered leonardite is used, a sufficient amount of water (20% to 50% of the weight of leonardite) is added in order to assist the reaction between the leonardite and polyphosphate. If natural leonardite is used, there is ordinarily sufficient water to effect the reaction, and it is merely necessary to mix the leonardite and polyphosphate until a uniform mixture is obtained and dried to a powder. An alternative procedure is to make a concentrate of leonardite and two or three times the desired amount of polyphosphate and mix this combination in a moistened condition to form a uniform product. Then additional untreated leonardite is added to adjust the ratio of polyphosphate and leonardite to that desired and the mixture dried and ground to a powder. The final product is a tan or light brown color in comparison to the almost black color of the mixture of polyphosphate and leonardite.

The polyphosphates may be used individually or in various combinations. Those high in sodium create rapid solubility in fresh water as well as rapid solubility in contaminated water. Those high in phosphorus content have slower solubility in fresh and saturated water but are somewhat more reactive in terms of gel depressant action and viscosity reduction. The phosphates which are preferred for this invention are the glassy complex phosphates which have a weight ratio of sodium to phosphorus in the range of 1.1 to 2.0. The polyphosphates having a sodium to phosphorus ratio in the range of 1.1 to 1.3 have been found to be highly effective and also those having sodium to phosphorus ratios in the range of 1.6 to 2.0 have been likewise found to be effective. The preferred ratio is in the range of 1.1 to 1.7.

The leonardite-polyphosphate product markedly reduces gel strength and viscosity in additions up to 20 pounds per barrel of calcium-base drilling fluid. The first additions of 5 to 10 pounds per barrel reduce gel strength markedly and the later addition up to 20 pounds per barrel reduce fluid loss substantially. As the reduction in gel strength and fluid loss occurs, the viscosity of the fluid decreases to a point where the product pumps easily. A desirable feature of this invention is that the phosphate-leonardite product does not cause undesirable foam which air binds pumps and causes difficulty in drilling.

Relatively small quantities of water-soluble nonionic surfactants have a beneficial effect upon the leonardite-polyphosphate product. The amount of nonionic agent required is relatively small, ranging from 0.1% to 1.0% of the weight of the complete product, with the preferred quantity about 0.5%. It is possible that the mildly alkaline polyphosphates and the weakly acid leonardite are relatively slow in reacting and that small proportions of nonionic detergents or wetting agents aid in the reaction between the polyphosphate and leonardite or assist in carrying the reaction to completion faster at lower temperature. In any event the nonionic detergent or wetting agents aid in solubilizing the polyphosphate and leonardite and produce a product which has improved viscosity reducing properties in calcium-based drilling fluids.

Among the nonionic surface active agents (detergents and wetting agents) which can be used in promoting interaction of leonardite and polyphosphates are condensation products of fatty acids with ethylene oxide to produce fatty acid esters of polyethylene oxide such as polyoxyethylene glycol stearate, oleate, linoleate, caprylate, laurate, myristate and palmitate; fatty acid esters of sorbitol anhydrides such as sorbitan monolaurate, sorbitan monopalmitate and sorbitan monooleate; polyoxyethylene sorbitan fatty acid esters such as polyoxyethylene sorbitan monopalmitate, monolaurate and monooleate; fatty acid polyamides such as those produced from stearic, oleic, lauric, palmitic and myristic acids and polyamines such as ethylenediamine, diethylene-triamine and triethylene-tetramine; and fatty acid polyamide-polyester derivatives produced by heating fatty acids such as stearic, oleic and palmitic acids with alkanolamines such as ethanolamine and diethanolamine to form ester-amides. All of these surface-active agents are essentially nonionic esters, ethers or amides or combinations thereof.

The invention is disclosed in further detail by means of the following examples which are provided for purposes of illustration only. It will be appreciated by those skilled in the art that numerous modifications in amounts of materials, conditions and equivalent materials may be made without departing from the invention as disclosed herein.

EXAMPLE 1

To a drilling fluid containing 25 pounds of high yield western bentonite hydrated in 42 gallons of fresh water was added 8 pounds of gypsum. There was an immediate increase in gellation, creating a viscous poorly pumpable fluid. To this viscous calcium base drilling fluid thinners were added at the rate of 5 pounds per barrel of drilling fluid. The composition of the various thinners and their effect on viscosity, initial gel strength, fluid loss and other properties are indicated in the following tables. Table I represents the tests conducted at 75° F.; Table II represents the tests conducted after the same drilling fluids were heated to 188° F., held for 16 hours at that temperature, cooled to 75° F. and retested. In these tests gel strength was measured by the standard A.P.I. gel strength test.

*Table I (75° F.)*

| Additive—5 lbs./bbl. | Viscosity in cp. | Immed. Gel Strength in Grams | 10 Min. Gel Strength in Grams | Fluid Loss in cc. |
|---|---|---|---|---|
| None | 14 | 11 | 12 | 42 |
| Leonardite | 10 | 9 | 11 | 38 |
| Sodium Tripolyphosphate | 23 | 10 | 25 | 10 |
| 80% Leonardite, 20% Sodium Tripolyphosphate (Co-Solubilized) | 5 | 0 | 1 | 22 |
| Sodium Tetraphosphate | 16 | 1 | 5 | 10 |
| 80% Leonardite, 20% Sodium Tetraphosphate | 5 | 1 | 2 | 12 |
| Sodium Hydroxide Salt of Leonardite | 11 | 12 | 36 | 29 |

*Table II (after heating to 188° F.)*

| Additive | Viscosity in cp. | Immed. Gel Strength in Grams | 10 Min. Gel Strength in Grams | Fluid Loss in cc. |
|---|---|---|---|---|
| None | 9 | 8 | 8 | |
| Leonardite | 13 | 5 | 10 | |
| Sodium Tripolyphosphate | 30 | 7 | 20 | |
| 80% Leonardite, 20% Sodium Tripolyphosphate (Reacted) | 7 | 0 | 0 | |
| Sodium Tetraphosphate | 37 | 16 | 30 | |
| 80% Leonardite, 20% Sodium Tetraphosphate | 8 | 2 | 4 | |
| Sodium Hydroxide Salt of Leonardite | 15 | 6 | 14 | |

EXAMPLE 2

The effect of differing levels of polyphosphate concentration on the viscosity reducing properties of the leonardite-polyphosphate products were measured by adding polyphosphate-leonardite products to a standard calcium-base drilling fluid containing 25 pounds of high yield western bentonite hydrated in 42 gallons of fresh water containing 8 pounds of gypsum. To each barrel of this drilling fluid 5 pounds of the leonardite-polyphosphate products of varying composition were added as shown in Table III below. The viscosity and gel strength of the drilling fluid as well as fluid loss are given in Table III.

*Table III*

| Addition. Percent of Leonardite | Viscosity in cp. | Immediate Gel Strength in Grams | 10 Min. Gel Strength in Grams | Fluid Loss in cc. |
|---|---|---|---|---|
| 10% Sodium Tripolyphosphate | 7 | 4 | 6 | 15 |
| 15% Sodium Tripolyphosphate | 6 | 2 | 3 | 26 |
| 20% Sodium Tripolyphosphate | 5 | 0 | 2 | 12 |
| 25% Sodium Tripolyphosphate | 5 | 0 | 0 | 10 |

EXAMPLE 3

The effect of partially solubilizing (grinding together) various sodium polyphosphates with leonardite as contrasted to the effect of fully solubilizing the sodium polyphosphates in water and reacting them with leonardite are shown in Table IV below. In these experiments 20% of the sodium polyphosphate was admixed with 80 parts of leonardite, either by grinding together the ingredients or by fully solubilizing the polyphosphate and reacting it with the leonardite. The products so produced were dried at 250° F. for 2 hours and ground to a powder. In the tests 5 pounds of the various leonardite-polyphosphate products were added to each barrel of standard calcium-base drilling fluid containing 25 pounds of high yield western bentonite hydrated in 42 gallons of fresh water to which was added 8 pounds of gypsum. The effect of these thinners on viscosity and gel strength of the calcium-base drilling fluid are set forth below in Table IV:

*Table IV*

| Additive | Viscosity (cp.) | Immediate Gel Strength (Grams) | 10 Min. Gel Strength (Grams) |
|---|---|---|---|
| 20% Sodium tripolyphosphate (ground) | 5 | 0 | 1 |
| 20% Sodium tripolyphosphate (solubilized) | 5 | 0 | 2 |
| 20% Sodium Tetraphosphate (ground) | 6 | 0 | 3 |
| 20% Sodium Tetraphosphate (solubilized) | 5 | 1 | 2 |

What is claimed as new and is desired to be secured by Letters Patent of the United States is:

1. A calcium-base drilling fluid comprising an aqueous suspension of bentonite, a calcium compound in quantity sufficient to form a saturated aqueous solution, and 5 to 20 pounds of a thinner per 42-gallon barrel of fluid, said thinner containing 50% to 95% leonardite by weight and 5% to 50% soluble polyphosphate by weight, the quantities of materials being calculated on a dry weight basis.

2. A calcium-base drilling fluid comprising an aqueous suspension of bentonite, gypsum in quantity sufficient to form a saturated aqueous solution, and 5 to 20 pounds of a thinner per 42-gallon barrel of fluid, said thinner containing 50% to 95% leonardite by weight and 5% to 50% soluble polyphosphate by weight, the quantities of materials being calculated on a dry weight basis.

3. A drilling fluid as defined by claim 2 wherein the soluble polyphosphate is an alkali metal polyphosphate.

4. A drilling fluid as defined by claim 3 wherein the alkali metal polyphosphate is a sodium polyphosphate having a weight ratio of sodium to phosphorous in the range of 1.1 to 2.0

5. A drilling fluid as defined by claim 4 containing 0.1% to 1% by weight of a nonionic surfactant.

References Cited in the file of this patent

UNITED STATES PATENTS

| | | |
|---|---|---|
| 2,211,688 | Byck et al. | Aug. 13, 1940 |
| 2,650,197 | Rahn | Aug. 25, 1953 |
| 2,783,222 | Rahn | Feb. 26, 1957 |
| 2,813,826 | Crowley et al. | Nov. 19, 1957 |

FOREIGN PATENTS

| | | |
|---|---|---|
| 803,544 | Great Britain | Oct. 29, 1958 |

OTHER REFERENCES

Inukai: Oxidation of Lignite With Air or Dilute Nitric Acid, article in the Chemical Abstracts, vol. 50, 1956, p. 17,383.

Rogers: Composition and Properties of Oil Well Drilling Fluids, revised edition, published 1953 by Gulf Publishing Co. of Houston, Tex., pp. 310 to 313, 323 and 324.